United States Patent [19]
Tibbals, III

[11] Patent Number: 5,343,906
[45] Date of Patent: Sep. 6, 1994

[54] EMISSON VALIDATION SYSTEM

[75] Inventor: Harry F. Tibbals, III, McKinney, Tex.

[73] Assignee: Biodigital Technologies, Inc., McKinney, Tex.

[21] Appl. No.: 884,531

[22] Filed: May 15, 1992

[51] Int. Cl.$^5$ ............................. B65B 1/04; B65B 1/30
[52] U.S. Cl. ........................................ 141/83; 141/94; 141/95; 141/98; 73/23.31; 73/23.33
[58] Field of Search ................... 141/1, 87, 94, 95, 98, 141/311 R, 360; 73/23.31, 23.32, 23.33

[56] References Cited

U.S. PATENT DOCUMENTS

| | | |
|---|---|---|
| 3,748,654 | 7/1973 | Sutherland . |
| 4,075,632 | 2/1978 | Baldwin et al. . |
| 4,109,686 | 8/1978 | Phillips ..................................... 141/1 |
| 4,132,981 | 1/1979 | White . |
| 4,263,945 | 4/1981 | Van Ness ............................. 141/98 |
| 4,360,810 | 11/1982 | Landt . |
| 4,469,149 | 9/1984 | Walkey et al. ........................ 141/94 |
| 4,652,877 | 3/1987 | Gray . |
| 4,739,328 | 4/1988 | Koelle et al. . |
| 4,758,836 | 7/1988 | Scuilli . |
| 4,782,345 | 11/1988 | Landt . |
| 4,786,907 | 11/1988 | Koelle . |
| 4,816,839 | 3/1989 | Landt . |
| 4,835,377 | 5/1989 | Brown . |
| 4,838,323 | 6/1989 | Watts ..................................... 144/1 |
| 4,846,233 | 7/1989 | Fockens ................................ 141/94 |
| 4,853,705 | 8/1989 | Landt . |
| 4,864,158 | 9/1989 | Koelle et al. . |
| 4,888,591 | 12/1989 | Landt et al. . |
| 4,934,419 | 6/1990 | Lamont et al. ....................... 141/94 |
| 4,999,636 | 3/1991 | Landt et al. . |
| 5,209,275 | 5/1993 | Akiba et al. ........................... 141/83 |

FOREIGN PATENT DOCUMENTS

| | | | |
|---|---|---|---|
| 2502134 | 9/1982 | France ................................. 141/94 |
| 4044995 | 2/1992 | Japan .................................. 141/94 |
| 4253695 | 9/1992 | Japan .................................. 141/94 |

OTHER PUBLICATIONS

"Automatic Vehicle Identification", *Amtech* Publication, 1991.

*Primary Examiner*—Ernest G. Cusick
*Attorney, Agent, or Firm*—Ross, Howison, Clapp & Korn

[57] ABSTRACT

An emissions validation system is comprised of a plurality of sensors (42), (36), (26) and (34) for monitoring the various emissions and diagnostic aspects of a vehicle (10). An emissions validation system (18) is operable upon refuelling through a refuelling line (20) to interface through an interface (14) to a CPU (28). The CPU (28) retrieves the stored dam and transfers it through the interface (14), through an electrical line (22) to a main CPU (26) in the emissions validation system (18). The main CPU (26) then evaluates this dam, in addition to monitoring the amount of fuel that is placed back into the vehicle's tank (32). This allows a complete record of the vehicles history to be maintained.

22 Claims, 7 Drawing Sheets

EMISSION VALIDATION SYSTEM

BACKGROUND OF THE INVENTION

In recent years, the reduction of emissions has received an increasing amount of attention. Although there have been a number of relatively low emission alternatives to the internal combustion engine, the internal combustion engine utilizing diesel or gasoline has survived, due in part to the ability of engineers to constantly improve emission controls and maintain the internal combustion engine at governmental specified standards. However, one problem that exists with respect to emission control systems is with respect to maintaining the controls in some state of repair. As such, an automobile when it leaves the factory may meet emission standards, but this can change over time such that the bulk of the vehicles on the road no longer come close to meeting emission standards. One method employed by municipalities to reduce emissions has been to require periodic inspections that utilize computerized systems to measure the emissions, with the result that a validation sticker is not provided to the owner of the vehicle unless the emission tests have been passed. If not passed, the owner of the vehicle is given a certain amount of time to repair the vehicle and bring it within the standards. Although the systems have improved the level of emissions entering the environment, they typically operate on a periodic basis and are relatively easy to tamper with.

Another alternative that has been looked into is alternative fuel systems such as natural gas and propane, as these are cleaner burning fuels. Typically, the average consumer does not purchase this type of fuel and the vehicles that can burn them, due to the relatively difficult access to these fuels. However, governments and large organizations do have the ability to switch over to these type of fuels, since they typically maintain their own fuel supply. Further, the government has introduced certain incentive plans that provide tax breaks, etc., for an organization or municipality that provides a plan for reducing overall emissions with vehicles that can burn these fuels.

SUMMARY OF THE INVENTION

The present invention disclosed and claimed herein comprises an emission validation system. The emission validation system includes a vehicle fueling system associated with a vehicle and a fuel station for dispensing fuel from a main fuel tank to the fuel tank of the vehicle. The vehicle fueling system has associated therewith a sensor for sensing performance parameters of the vehicle, the performance parameters including emission parameters. A memory device is provided for averaging and storing the operating parameters over a predetermined period of time to provide a history of the operating parameters over the predetermined period of time. A vehicle interface device is operable to access the stored history information from the memory device in conjunction with fuel being input to the fuel tank through a fuel intake port. The fuel station includes a fuel station interface device that is operable to be interfaced with the vehicle interface device to allow the accessed history information to be transferred through the fuel station interface device to a processor. A fuel dispensing system is operable to dispense fuel from the main fuel tank to the vehicle tank through the intake port with a fuel flow meter operable to sense the fuel delivered to the vehicle. The processor is operable to control the vehicle interface device and the fuel station interface device to access the stored history from the memory device and the vehicle to update a main database. The main database contains the overall operating history of the vehicle, which is updated for each fueling operation.

In another aspect of the present invention, the history stored in the memory device comprises a history of the performance parameters over a period of time between fueling operations. Upon receiving a request for fuel delivery to the vehicle, the fueling station is also operable to compare the accessed history information with predetermined history standards. If the accessed history information meets or exceeds these predetermined history standards, fuel is delivered to the vehicle. However, if the accessed history information does not meet the predetermined history standards, the fuel delivery to the vehicle is inhibited.

The vehicle interface device and fuel station interface device comprise mated connectors. The vehicle interface device connector is disposed proximate to the fuel intake port such that the fuel station interface device connector can be mated thereto prior to initiating the fueling operation and wherein the fuel delivery device is disposed within the intake port.

An alternate embodiment of the vehicle interface device and fuel station interface device comprises an IC card. The IC card has associated therewith a memory and processing system and an interface connector. The interfaced connector is operable to be interfaced with a card reader on the vehicle, which card reader is operable to interface with the memory device to allow access of the stored history information for transfer to the memory in the IC card. The IC card is then transferred to the fuel station and an associated IC card reader disposed thereat. The information in the memory associated with the IC card can then be transferred to the processing system.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
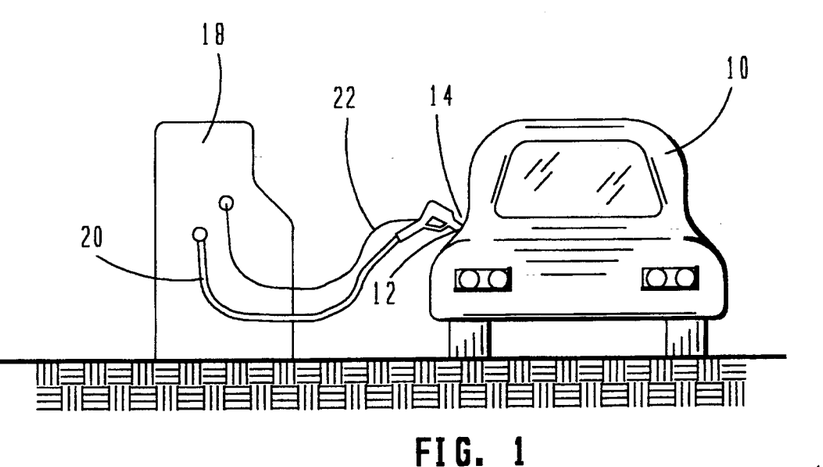
FIG. 1 illustrates a perspective view of the emission validation system of the present invention.

Referring now to FIG. 1, there is illustrated a perspective view of the emission validation system for delivering fuel to a vehicle. A vehicle 10 is provided, which has an inlet 12 for receiving fuel and an emissions validation interface 14. An emissions validation system 18 is provided, which is operable to deliver fuel to the inlet 12 through a fuel supplying hose 20. In addition, an electronic cable 22 is provided for interfacing with interface 14. Whenever fuel is delivered to the vehicle, information is transmitted between the automobile 10 and the emissions validation system 18.

Figure 2:
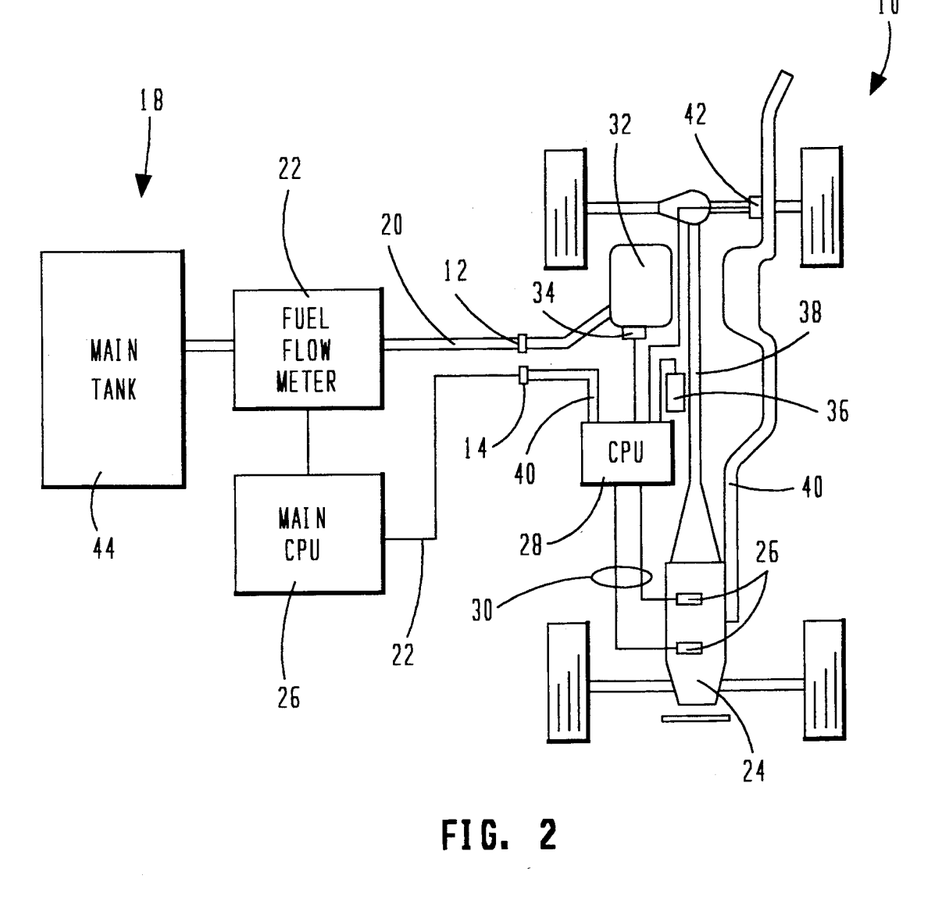
FIG. 2 illustrates a schematic view of an automobile and the emission validation system.

Referring now to FIG. 2, there is illustrated a schematic view of the automobile 10 and the emissions validation system 18. The automobile 10 has a plurality of sensors associated therewith. An automobile engine 24 has associated therewith sensors 26, which are routed to a central processing unit (CPU) 28 through wires 30. Additionally, a fuel tank 32 is provided which is interfaced with the inlet 12. The fuel tank 32 has a sensor 34 associated therewith to determine the various fuel levels. The mileage of the car is determined by a sensor 36, which is disposed on a drive shaft 38 that drives the wheels of the vehicle. Further, an exhaust system 40 associated with the car has an emissions sensor 42 associated therewith. The sensor 34, the sensor 36 and the sensor 42 are all connected to the CPU 28.

The CPU 28 is connected through a cable 40 to the interface 14, which is connected to a main CPU 26 in the emissions validation system 18. Fuel is provided through the hose 20 and controlled with a fuel flow meter 22. The fuel flow meter provides an input to the main CPU 26 to determine how much fuel is being input to the vehicle 10 from a main tank 44.

The emissions validation system 18 is operable to collect emissions data from the vehicle 10 with the sensors associated with the vehicle 10 being essentially modifications of conventional engines and exhaust monitoring systems used on motor vehicles and/or stationary combustion engines (such as portable electric power generators and air compressors). The emissions validation system 18 collects data through electrical signals received from the sensors on the engine and an exhaust system. The sensors are located in the exhaust stream near the exit vent of the exhaust pipe, after the pollution control system and muffler. The type of sensors that are utilized are electopotentiometric gas specific sensors for oxygen, carbon monoxide, carbon dioxide, oxides of sulfur, oxides of nitrogen, hydrocarbons, and heavy metals such as lead suspensions and tetraethyl lead; mass spectrometric detectors capable of generating an analog or a digitized signal representing intensities of ions characteristic of the above compounds and substances; gas chromatography separation and sensor systems capable of generating signals for the above substances, and spectrometers generating signals indicating intensity of absorption of light for various atomic and molecular modes of absorption of those compounds. Examples of types of electrochemical sensors are: Dynamation, Inc. Model 929, McNeill International Model 3E for CO, Models 3NT or 3NSS for NO, Model 3NDH for $NO_2$, Models 3ST and 3SS for $SO_2$, Bacharach Sentinel 4 Model for CO, $SO_2$, NO, NOX, total hydrocarbons; the Industrial Scientific Model TMX410. Examples of gas chromatographic sensors are Dynamation Model CGM gas monitor, and HP 92 manufactured by Hewlett Packard. Examples of mass spectrometer sensors are Bruker-Franzen Model MM1, Teledyne Model CBMS, Milton Roy, Fisons Instruments UG Prima 600X. Examples of Spectra sensors are the McNeill $CO_2$ ambient monitor, Horiba HRE-2362A, Servomex Model 2500, Teledyne Analytical Instruments Model 911.

The signals that are collected in the automobile are propagated by the sensors through the insulated wires connected to the CPU 28 to the interface device 14. The interface device 14 is an electrical or optical cable manifold that is located next to the refilling point of the fuel tank on the vehicle. However, as will be described hereinbelow, this information could be transferred to an IC card for storage therein and transfer to a similar card reader on the emissions validation system 18. The interface 14 channels the wires from the CPU 28 into a standard electrical or optic fiber connector mounted to be accessible when the fuel cap protector is open. The connector mates to a matching connector on the electrical cable 22 that is attached to the fuel line 20 on a bearing mount in such a manner that the rotation of the refueling line does not twist a cable leading from the end of the refueling line to the fuel pump housing.

In addition to information from the sensors, signals generated by the CPU 28 also provide information regarding vehicle identification codes. A vehicle identification code generator is provided that reads signals from the vehicle engine Ignition Control System, through wires or fibers connected to a module typically located under the vehicle dashboard display. The vehicle identification code generator collects Ignition Control System data and reads out the vehicle identification, vehicle mileage and other data in response to a control signal sent from the computer. When the vehicle emission system 18 collects the various data, it is used to determine the following items:

1. VMT (Vehicle Miles Travelled) per vehicle and for fleets;
2. Fuel economy (both VMT divided by fuel quantity and VMT divided by fuel costs) for each vehicle and fleet;
3. Emissions per vehicle and for aggregate fleet of measured pollutants on daily, weekly, monthly and annual basis;
4. Identification of vehicles operating outside relevant regulatory emission standards;
5. Volume of emissions above or below standards per vehicle and for aggregate fleet;
6. EPA vehicle emission credits earned for vehicles operating at levels better than required by relevant standards.

Figure 3:
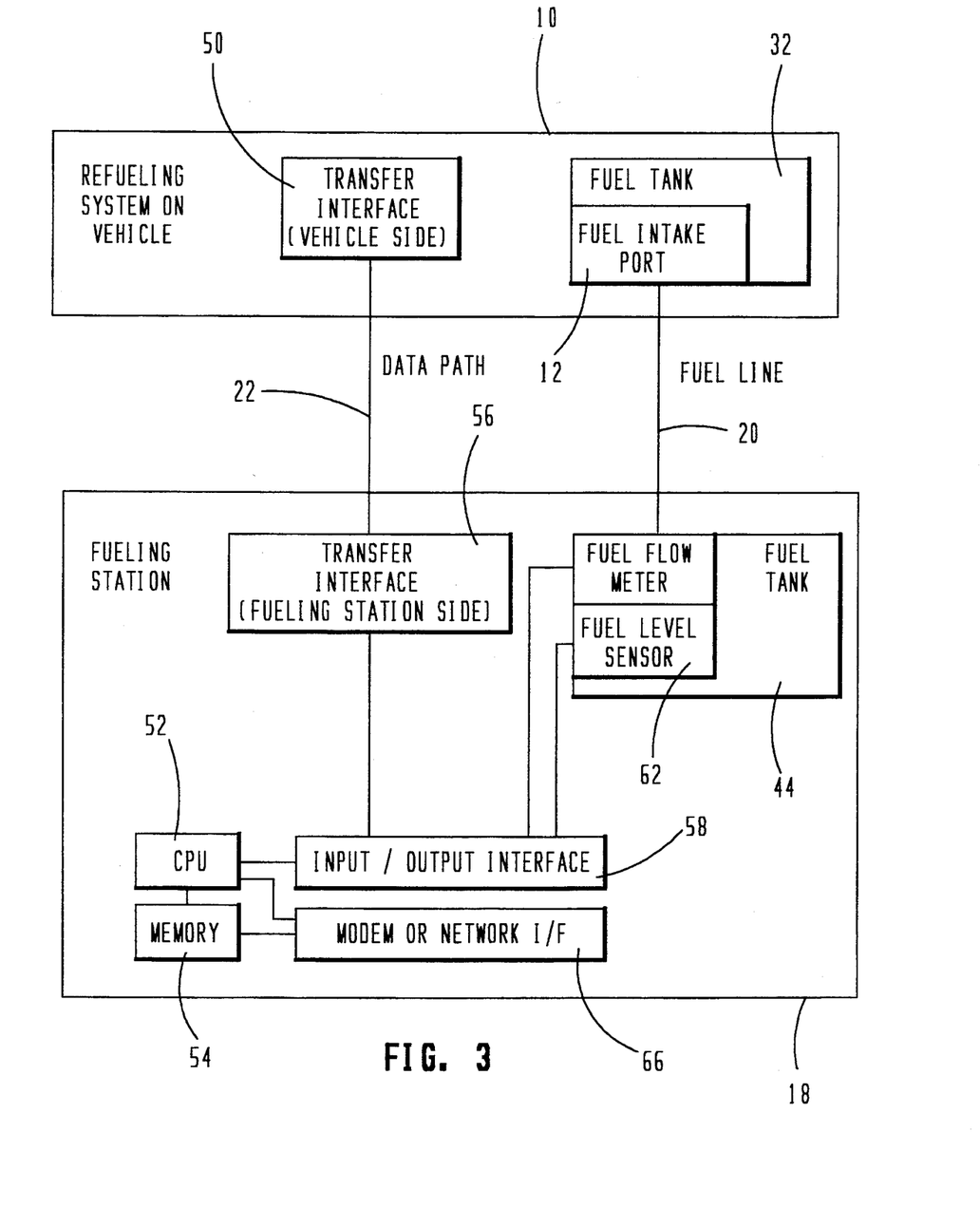
FIG. 3 illustrates a block diagram of both the refueling system on the vehicle and the fueling station.

Referring now to FIG. 3, there is illustrated a block diagram of the electronics for the fueling system on the fueling station. The refueling system on the vehicle is comprised of a transfer interface 50 that is interconnected with the cable 22 to provide a data path. The fuel tank 32 is connected to the fuel intake port 12 to fuel line 20. The fueling station is comprised of a central processing unit (CPU) 52 and a memory 54, that CPU 52 and memory 54 corresponding to the main CPU 26 in FIG. 2. A transfer interface 26 is provided at the fueling station for interfacing with the cable 22. The output of the transfer interface 56 is connected through an I/O interface 58 to the CPU 52. Additionally, a fuel flow meter 60 and fuel level sensor 62 are provided to interface between the fuel tank 44 and the I/O interface 58. Further, a modem 66 is provided for interfacing with the CPU 52 and memory 54 to allow the system to interface through a telephone line with the main station or through a network I/F.

Figure 4:
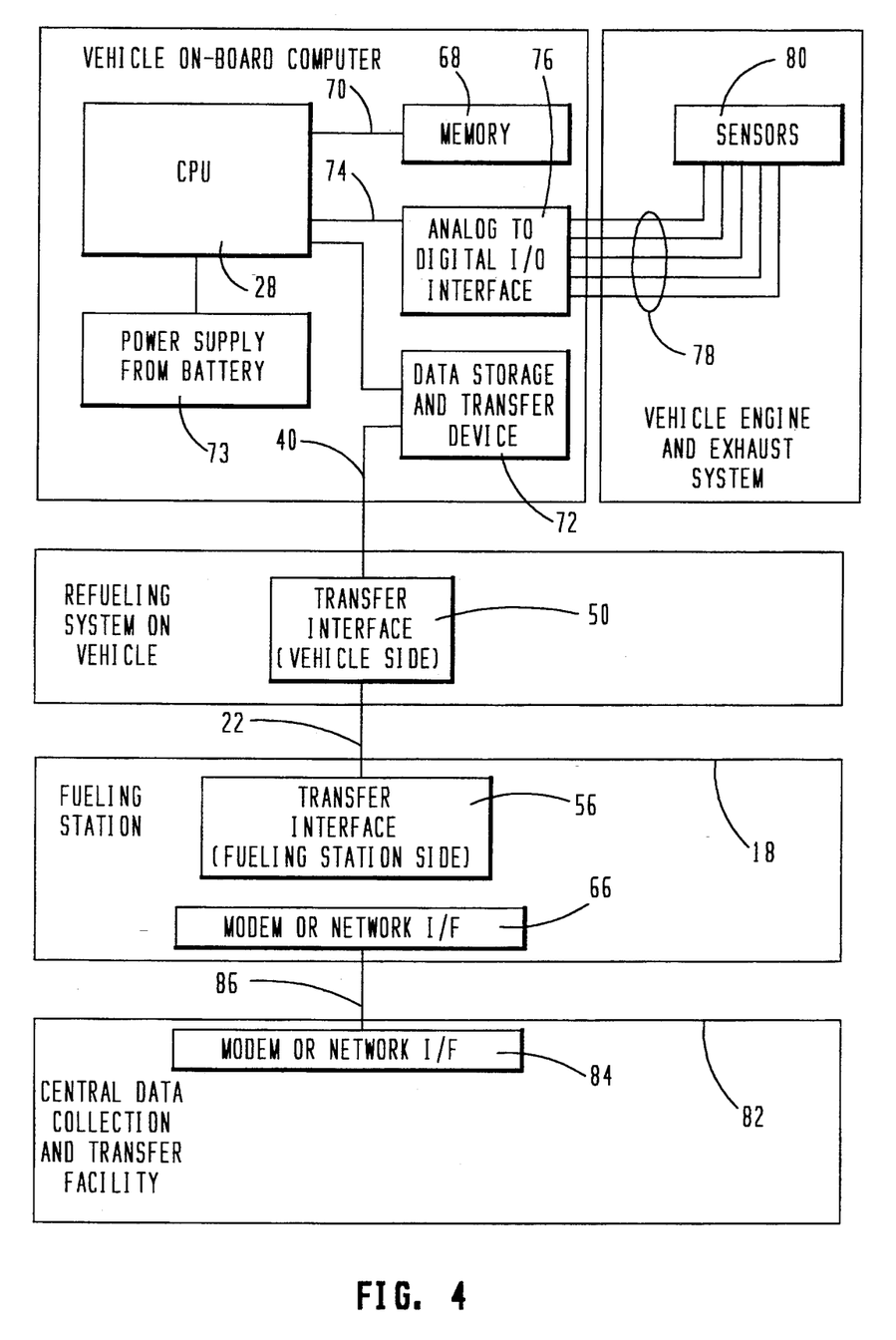
FIG. 4 illustrates a block diagram of the on-board computer associated with the vehicle and that associated with the fueling station.

Referring now to FIG. 4, there is illustrated a detailed block diagram of the CPU 28 and the associated circuitry for storing the data. The CPU 28 is connected through a digital bus 70 to a memory 68. The digital bus 70 is generally comprised of a data bus and an address bus. The memory 68 is generally comprised of non-volatile Read Only Memory (ROM) for storing the program instructions and also comprised of some scratch pad Random Access Memory (RAM). A data storage and transfer device 72 is also provided which is generally comprised of Random Access Memory. The Random Access Memory is typically volatile, but can be made non-volatile by using battery backed-up RAMs. The power supply in the battery 73 is provided for powering the overall system. However, battery backed-up RAMs typically comprise small lithium cells that are associated therewith and made an integral part of the package. Further, lithium cells can be provided on the board on which the CPU 28 and data storage and transfer device 72 are disposed. The data storage and transfer device 72 is operable to be interfaced through the cable 40 to the transfer interface 50. When the cable 22 is connected to the transfer interface 50, thus connecting it to the transfer interface 56, the data storage and transfer device 72 senses this and initiates the dam transfer.

The CPU 28 communicates with an analog-to-digital (A/D) I/O interface 76 through a digital bus 74. The A/D interface 76 is operable to interface with a sensor bank 70 and the vehicle engine and exhaust system through a plurality of analog lines 78. The sensors 80 comprise a bank of sensors which generally define the sensor 42. However, it should be understood that the sensor bank 80 also represents the other sensors 34, 36 and 26, which monitor other aspects of the system. Further, the analog lines 78 can also interface with various diagnostic sensors. Additionally, other processors that are built into the vehicle can generate digital data which can be transferred through a digital interface (not shown) to the CPU 28. The CPU 28 is then operable to route this information to the data storage and transfer device 72. The data storage and transfer device 72 is comprised of a dual port RAM.

The fueling station is generally comprised of the emissions validation system 18, which is operable to communicate with a central data collection and transfer facility 82, the central data collection and transfer facility 82 having a modem or network I/F 84 that can communicate with the modem or network I/F 66 through a communication link 86. In this manner, the data that is received through the transfer interface 56 at the fueling station can be immediately transferred to the central data collection and transfer facility. Typically, this data is buffered at the fueling station and then transferred at a later time, either upon initiation by the fueling station or in response to a poll from the central data collection and transfer facility. This type of data processing is conventional with respect to credit verification in Automatic Teller Machines (ATMs).

Figure 5:
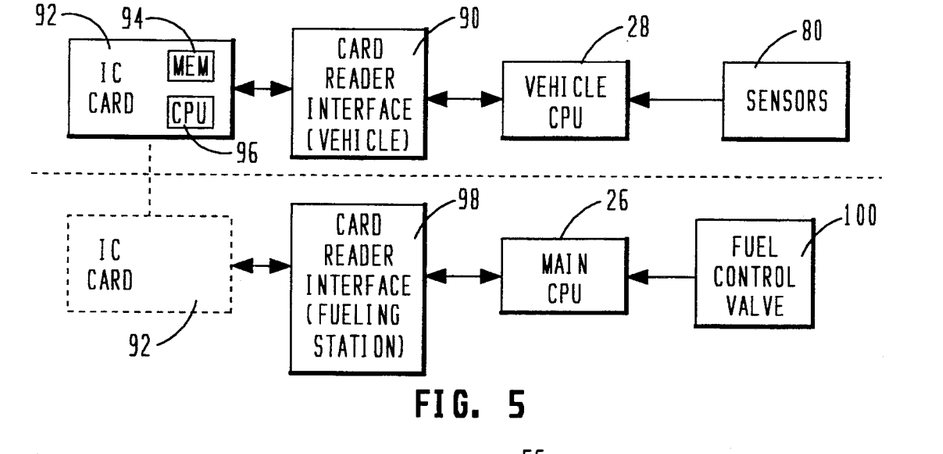
FIG. 5 illustrates a block diagram of an alternate embodiment of the present invention utilizing an IC card reader.

Referring now to FIG. 5, there is illustrated an alternate embodiment of the invention, wherein the dam is not transferred through a transfer interface device. In the system illustrated in FIG. 5, the vehicle CPU 28 interfaces with a card reader interface 90. The card reader interface 90 is operable to interface with an IC card 92. The IC card 92 is the type of card that is referred to as a "smart" card. This type of card is typically a rectangular-shaped, thin, laminated member having a memory 94 and a processing unit 96 associated therewith. Additionally, the IC card 92 has a battery associated therewith. Some type of connector is provided for interfacing with the card reader 90, such that when the IC card 92 is inserted into the card reader interface 90, processing instructions in the IC card 92 can interface with the card reader interface 90 and to the CPU 28. This connector typically utilizes an RS232 serial data protocol. This allows the CPU 28 to download data into the card reader 92, which card reader 92 can also have a prestored identification number associated with the card 92.

The IC card 92 is operable to be removed upon entering a fueling station and inserted into a card reader interface 98 and allow the IC card 92 to interface with the CPU 26. The CPU 26 can then access the data stored in the memory 94 within the card 92. Since this data is comprised in part of an identification number, the CPU 26 can then scan its local memory 54 to determine if an ID list exists having the ID of the card 92 associated therewith. If not, the CPU 26 can then interface with the central data collection and transfer facility to validate the card.

Upon validation of the card, the CPU 26 then allows fuel to be transferred to the vehicle through a fuel control valve 100. This information is monitored and stored in a main database at the central data collection and transfer facility. Further, the data can be stored on the IC card 92, which IC card 92 could be integrally associated with the vehicle, similar to the operation of a key. Therefore, a complete record of the vehicle's emission and fuel usage could be permanently associated with the vehicle through the memory 94 in the card 92. Further, a command could be entered prior to using the fueling station to transfer data to the IC card 92 prior to removal.

Figure 6:
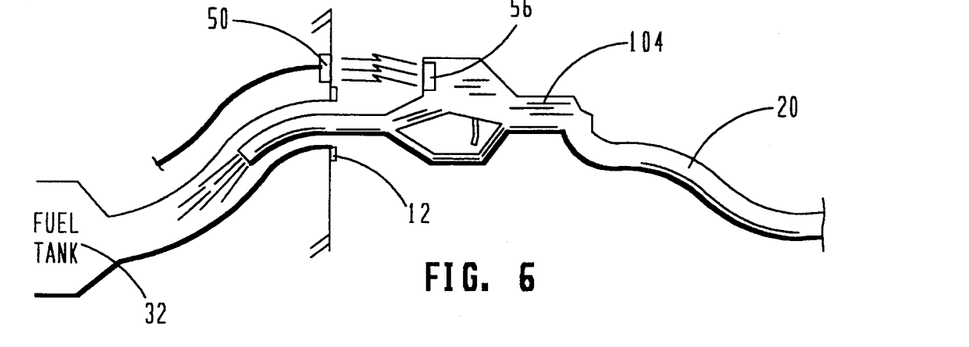
FIGS. 6, 6a and 6b illustrate details of one type of sensor.
Figure 6A:
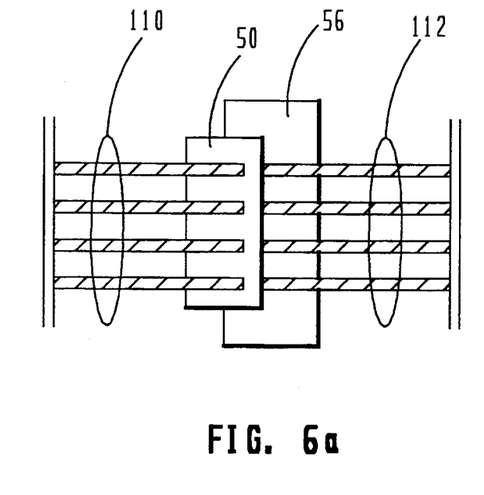

Referring now to FIG. 6, there is illustrated a side view of the interface 50 and 56. Typically, the fuel line 20 is connected to a nozzle 104, which nozzle 104 is operable to allow an operator to dispense gas into the fuel tank through the inlet 12. Illustrated in FIG. 6 is an optical interface utilizing some type of optical fibers with a connection that allows a light path to be generated between the transfer interface 50 and the transfer interface 56. FIG. 6a illustrates one embodiment wherein a bundle of optical fibers 110 is associated with the transfer interface 50, such that they abut up against the outermost surface thereof. A second bundle of optical fibers 112 is disposed at the transfer interface 56 side with the ends thereof abutting up against the outermost surface thereof. The two transfer interfaces 50 and 56 are operable to mate in such a manner that the ends of the corresponding fibers in bundles 110 and 112 match up and allow data transfer to occur therebetween. With such a configuration, it is not necessary to have any type of electrical current flowing through an electrical connection, which electrical connection could cause a spark and be a hazard.

Figure 6B:
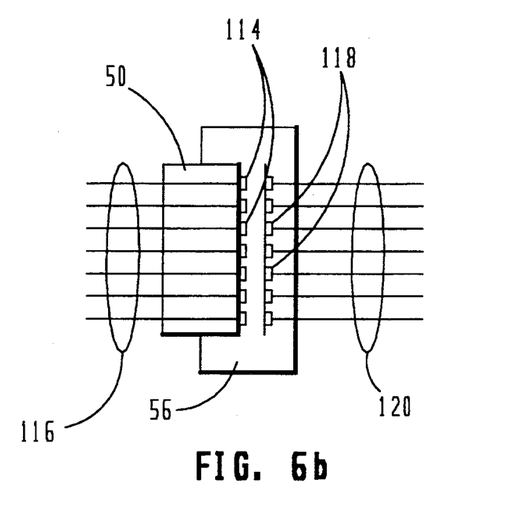

FIG. 6b illustrates an alternate embodiment of the optical coupling wherein a plurality of diodes 114 are disposed on the transfer interface 50 and interfaced with a plurality of electrical wires 116, which are connected to drivers (not shown). The transfer interface 56 has a plurality of opto-receivers 118 which are operable to receive the light emitted from the light emitting diodes 50, the light emitting diodes 50 providing for transfer of a digital word across the interface. The opto-receivers 118 are connected through wires 120 to a set of receivers and preamplifiers (not shown).

Figure 7:
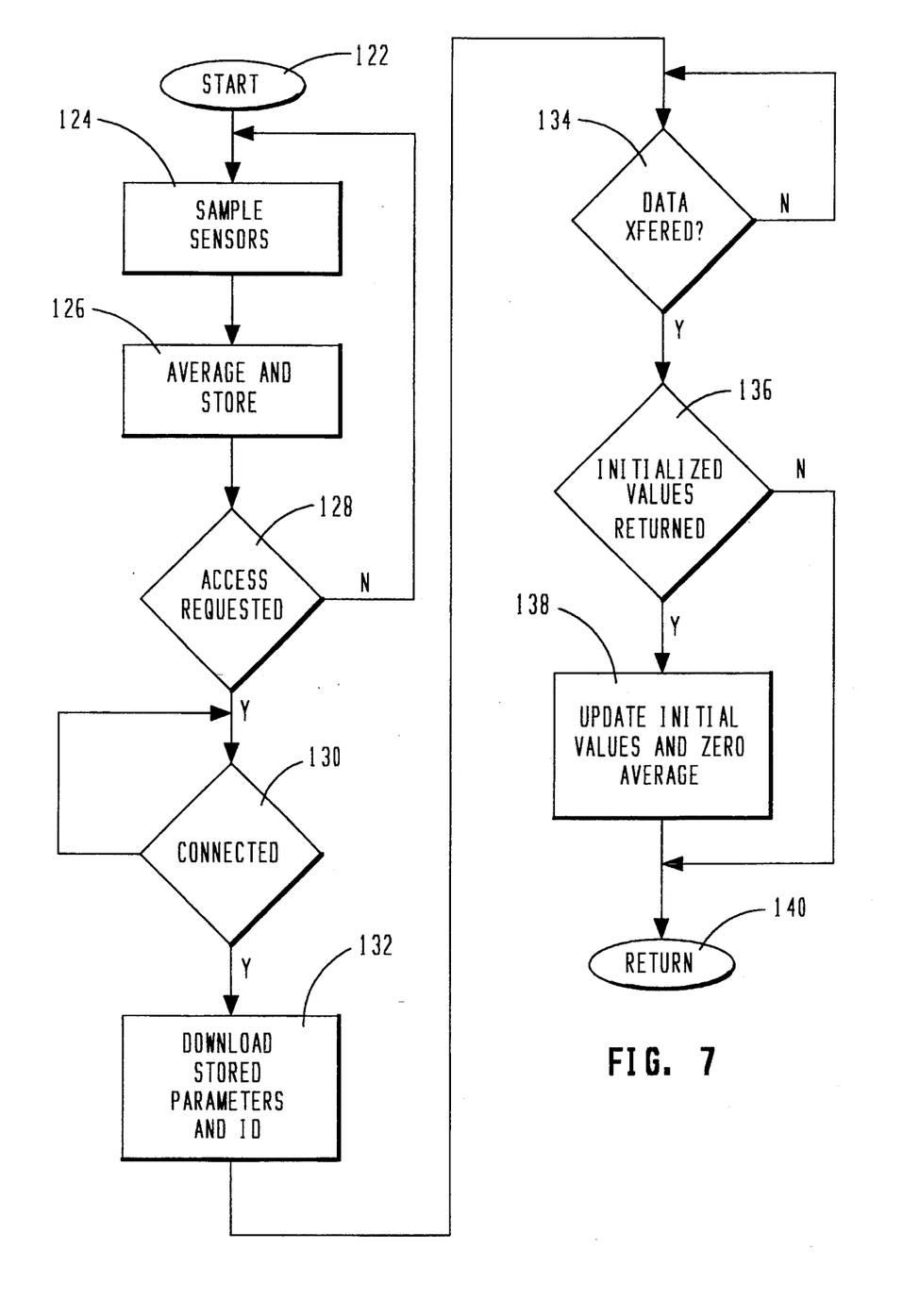
FIG. 7 illustrates a flowchart for operation of the vehicle fueling system.

Referring now to FIG. 7, there is illustrated a flowchart for the operation of the vehicle refueling system. The program is initiated at a start block 122 and then proceeds to a function block 124 to sample the sensor outputs. This information is then averaged and stored in the memory device, as indicated by a function block 126. The program then proceeds to a decision block 128 to determine whether access has been requested through the interface device 50. If not, this indicates that a refueling operation has not begun. The program would return back to the input of function block 124.

If an access has been requested, the program will flow to a decision block 130 to determine if a connection has been made. If not, the program loops back to the input. If so, the program flows to a function block 132 to download the stored parameters and the associated ID of the vehicle. The program would then flow to a decision block 134 to wait for all dam to be transferred. When all data is transferred, the program flows to a decision block 136 to determine whether initialized values are to be returned. As described above, certain parameters that are measured, such as fuel level, may have initial parameters that are required. These can be returned by the fueling station. However, in certain instances, everything is zeroed after a refueling operation. If initialized values are returned, the program flows to a function block 138 to update the initial values and zero the overall averaging operation. If no initialized values are to be returned, the program flows around the function block 138, both function blocks 138 and the bypass path input to a return block 140. The system will then return to the start block 122 and again sample the sensors 124 and update the stored parameters.

Figure 8:
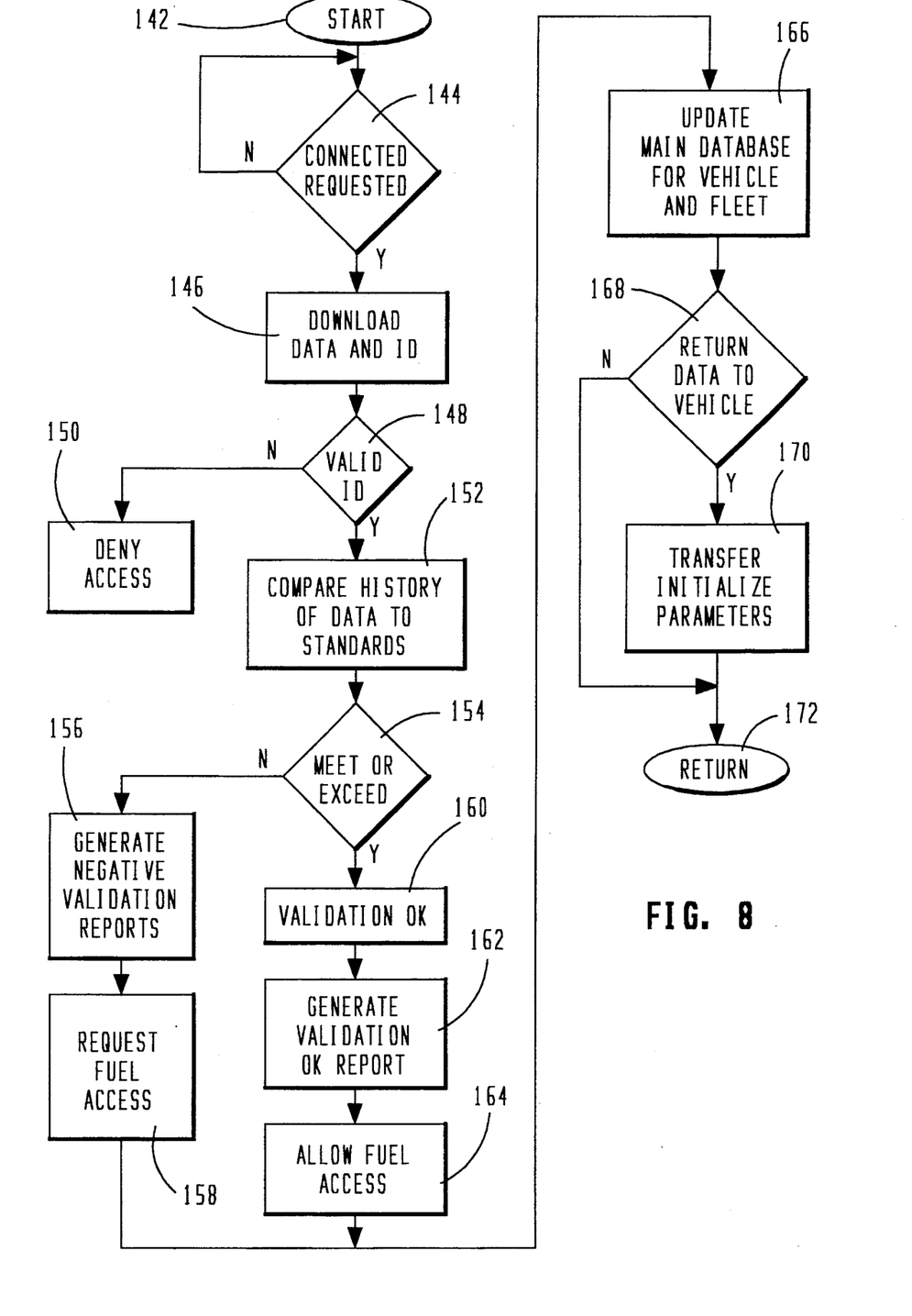
FIG. 8 illustrates a flowchart for operation of the emission validation station.

Referring now to FIG. 8, them is illustrated a flowchart depicting the operation in the fueling station. The program is initiated at a start block 142 and then proceeds to a decision block 144 to determine whether a connection has been requested, i.e., a fueling operation has begun. If not, the program loops back to the input of the decision block 144. If a connection has been requested, the program flows to a function block 146 to download data and ID information through the dam link between the vehicle and the fueling station. The program then flows to a function block 148 to determine if a valid ID was received. If not, the program flows to a function block 150 to deny access. However, if a valid ID was transferred and compared true with a stored list, the program would flow to a function block 152 to compare the history of the averaged data accessed from the vehicle to predetermined history standards. These predetermined history standards provide a benchmark for the operation. The program would then flow to a decision block 154 to determine whether the accessed history information meets or exceeds the predetermined standards. If not, the program would flow to a function block 156 to generate a negative validation report and then to a function block 158 to require the system operator to request fuel access before access would be allowed.

If the accessed history meets or exceeds the predetermined standards, the program would flow from decision block 154 to a function block 160 to provide a validation okay signal. The program would then flow to a function block 162 to generate a validation okay report and then to a function block 164 to allow fuel access. The output of function blocks 158 and 164 then flows to a function block 166 to update the main database for the vehicle and for the fleet. The program then flows to a decision block 168 to determine whether data is to be returned to the vehicle in the form of initialized parameters. If not, the program flows to a return block 172 and, if so, the program flows through a function block 170 to the return block 172, function block 170 providing a transfer of initializing parameters such as fuel level, fuel provided to the vehicle, etc.

Figure 9:
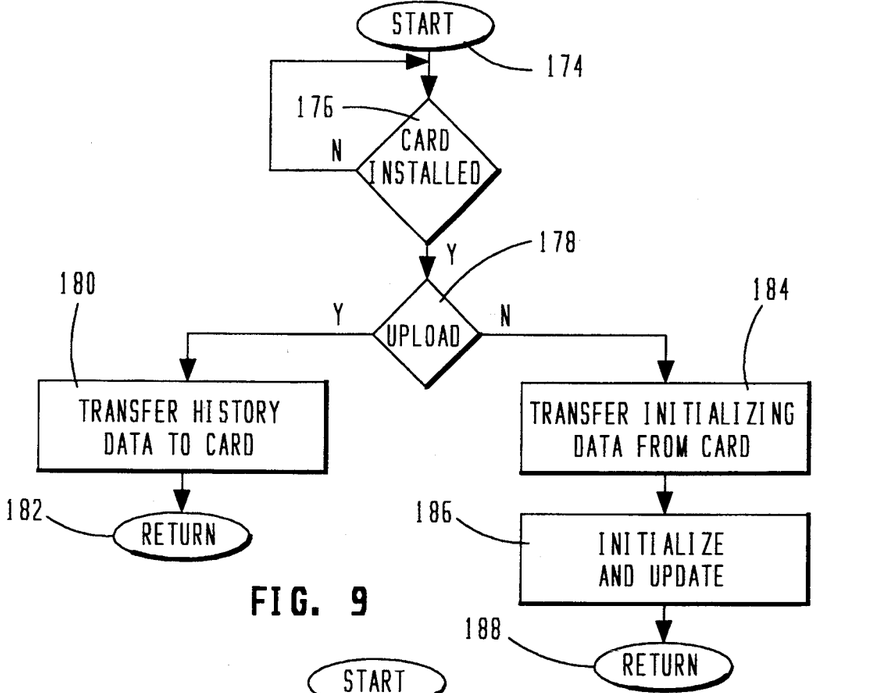
FIGS. 9 and 10 illustrate flowcharts depicting the operation of the IC card.

Referring now to FIG. 9, there is illustrated a flowchart depicting the operation of the IC card at the vehicle refueling system. The program is initiated at a start block 174 and then proceeds to a decision block 176 to determine whether the IC card is installed. If not, the program loops back to the input to wait for the card to be installed. If a card is installed, the program flows to a decision block 178 to determine whether the operation is an upload operation, i.e., data is to be transferred to the card. If so, the program flows to a function block 180 to transfer history data to the card from the vehicle memory device, and then to a return block 182. If data is to be downloaded to the IC card, the program would flow to a function block 184 to transfer initializing data from the card to the vehicle processing system. The program would then flow to a function block 186 to initialize and update the overall operating parameters of the system and then to a return block 188.

Figure 10:
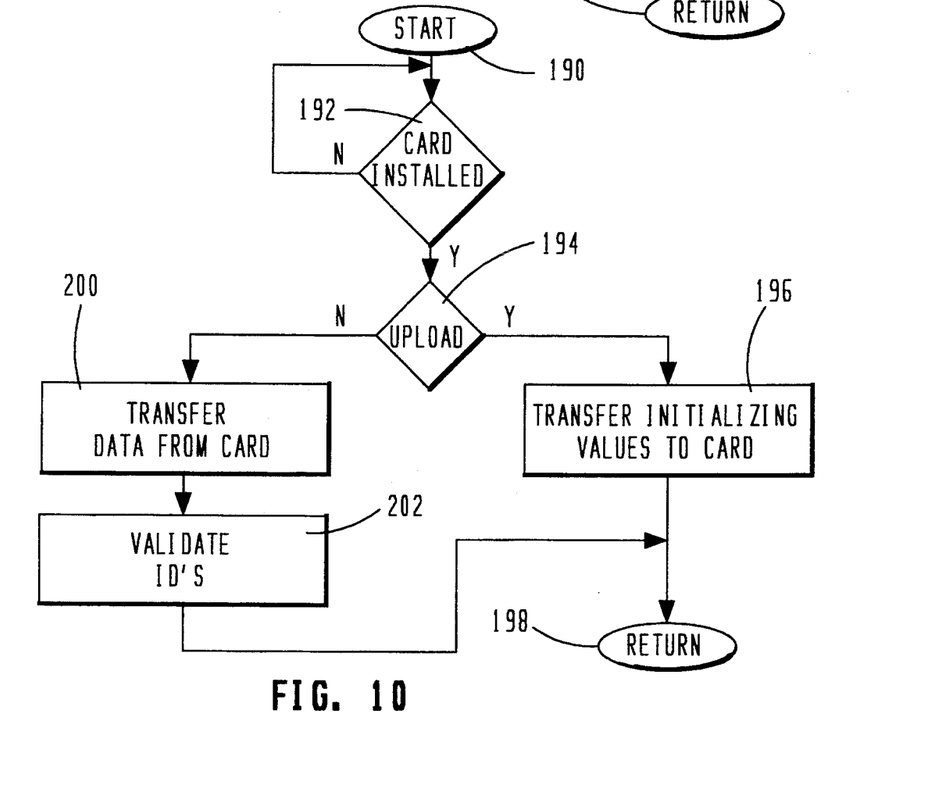

Referring now to FIG. 10, there is illustrated a flowchart depicting the operation of the IC card reader at the fueling station. The program is initiated at a start block 190 and then proceeds to a decision block 192 to determine whether the card has been installed. If not, the program loops back to the input. If so, the program flows to a function block 194 to determine whether the data is to be uploaded. If so, the program flows to a function block 196 to transfer initializing values to the IC card and then to a return block 198. If data is to be downloaded, the program flows from decision block 194 to a function block 200 to transfer data from the card to the processing system at the fueling station. The program then flows to a function block 202 indicating the operation wherein the ID is validated. The program will then flow to the return block 198.

In summary, there is provided a system that allows automatic monitoring and downloading of data from a diagnostic and emissions monitoring system on a vehicle. This information is stored in a memory on the vehicle and, at a later time, transferred to an emissions validation system. The emissions validation system requires this transfer in conjunction with a refueling operation. Upon refueling, an interface is effected whereby the diagnostic and/or emissions information associated with the vehicle is transferred to the emissions validation system and then transferred to a main database for evaluation thereof.

Although the preferred embodiment has been described in detail, it should be understood that various changes, substitutions and alterations can be made therein without departing from the spirit and scope of the invention as defined by the appended claims.

What is claimed is:

1. An emissions validation system, comprising:
a vehicle refueling system having:
a sensor for sensing emission parameters of a vehicle over a predetermined period of time;

a memory device for storing said sensed emission parameters of the vehicle over said predetermined period of time to provide a history of said sensed emission parameters over said predetermined period of time, a vehicle interface device for allowing said stored accrued emission parameters to be accessed, and a fuel intake port for allowing fuel to be input to a fuel tank on the vehicle; and a fuel station for storing an accrued history of said sensed emission parameters of the vehicle indicating the history of the emission parameters of the vehicle, over a larger period of time than said predetermined period time, said fuel station having a main fuel tank, a fuel station interface device for being interfaced with said vehicle interface device, a fuel dispensing system for delivering fuel to the fuel intake port of the vehicle, a fuel flow meter for sensing the fuel delivered to the vehicle, a database for containing said accrued history of said sensed emission parameters of the vehicle, and a processor for controlling said vehicle interface device and said fuel station interface device to access said accrued emission parameters from said memory device in said vehicle refueling system and operable to update said accrued history with said accessed accrued emission parameters over said predetermined period of time.

2. The validation system of claim 1 wherein said predetermined period of time over which said accrued emission parameters are accrued is initiated upon the occurrence of a predetermined event.

3. The validation system of claim 2 wherein said predetermined event comprises the delivery of fuel to the vehicle and access of said stored accrued emission parameters by said fuel station.

4. The validation system of claim 1 wherein said processor is operable to compare said accessed accrued emission parameters from said vehicle interface device with predetermined standards and to provide a validation if said accessed accrued emission parameters meets or exceeds said standards.

5. The validation system of claim 4 wherein said processor is operable to inhibit fuel dispensing by said fuel dispensing system if said accessed accrued emission parameters do not meet said predetermined standards.

6. The validation system of claim 1 wherein said accrued history of emission parameters comprise in addition an accrued history of emission parameters of a fleet of vehicles of which the vehicle is a subset of and wherein said processor is operable to further update said fleet accrued history of emission parameters in conjunction with updating said accrued history of emission parameters of the vehicle.

7. The validation system of claim 1 wherein said vehicle interface device comprises a connector disposed proximate to the fuel intake port of said vehicle, and said fuel station interface device comprises a mating connector for being mated with said connector proximate to said fuel intake port on the vehicle when said fuel dispensing system is connected to said fuel intake port.

8. An emissions validation system, comprising:
a vehicle refueling system having:
a sensor for sensing performance parameters of a vehicle, a memory device for storing said sensed performance parameters over said predetermined period of time as accrued performance parameters to provide a history of said sensed performance parameters over said predetermined period of time, a fuel intake port for allowing fuel to be input to a fuel tank on the vehicle;

a vehicle interface device for allowing said stored accrued performance parameters to be accessed, said vehicle interface device having:

an IC card having a memory and a processing unit associated therewith for storing information in association with said IC card, and a card reader for allowing access to said IC card for allowing transfer of said accrued performance parameters stored in said memory device to be transferred to said memory associated with said IC card; and a fuel station for storing an accrued history of said sensed performance parameters of the vehicle indicating the history of the performance parameters of the vehicle, said fuel station having:

a main fuel tank;

a fuel station interface device for being interfaced with said vehicle interface device, said fuel station interface having:

an IC card reader for reading said IC card and allowing transfer of information stored in said associated memory of said IC card relating to said accrued performance parameters of the vehicle to be transferred to said processor in said fuel station;

a fuel dispensing system for delivering fuel to the fuel intake port of the vehicle, a fuel flow meter for sensing the fuel delivered to the vehicle, a database for containing said accrued history of said sensed performance parameters of the vehicle, and a processor for controlling the vehicle interface device and fuel station interface device to access said accrued performance parameters from said memory device associated with said IC card in said vehicle refueling system and operable to update said accrued history with said accessed performance parameters over said predetermined period of time.

9. The validation system of claim 8 wherein said predetermined period of time over which said accrued performance parameters are accrued is initiated upon the occurrence of a predetermined event.

10. The validation system of claim 9 wherein said predetermined event comprises the delivery of fuel to the vehicle and access of said stored accrued performance parameters by said fuel station.

11. The validation system of claim 8 wherein said processor is operable to compare said accessed accrued performance parameters from said vehicle interface device with predetermined standards and to provide a validation if said accessed accrued performance parameters meet or exceed said standards.

12. The validation system of claim 11 wherein said processor is operable to inhibit fuel dispensing by said fuel dispensing system if said accessed accrued performance parameters do not meet said predetermined standards.

13. The validation system of claim 8 wherein said accrued history of performance parameters comprise in addition an accrued history of performance parameters of a fleet of vehicles of which the vehicle is a subset and wherein said processor is operable to further update said fleet history of performance parameters in conjunction with updating said accrued history of performance parameters of the vehicle.

14. The validation system of claim 8 wherein said vehicle interface device comprises a connector disposed proximate to the fuel intake port of said vehicle and said fuel station interface device comprises a mating connector for being mated with said connector proximate to said fuel intake port on the vehicle when said fuel dispensing system is connected to said fuel intake port.

15. A vehicle emissions monitoring system, comprising:
- a sensor for sensing performance parameters of the vehicle;
- a memory device for storing and averaging said performance parameters over a predetermined period of time as accrued performance parameters to provide a history of said performance parameters over said predetermined period of time;
- a fuel intake port for allowing fuel to be input to a fuel tank; and
- a vehicle interface device for allowing said stored accrued performance parameters to be accessed, said vehicle interface device operating in response to the operation of fuel being input to said fuel intake port, said interface device having:
  - an IC card having associated therewith an IC card memory and a processing unit, and
  - a card reader for interfacing between said IC card and said IC card memory device to allow said IC card to process instructions in said associated processing unit to access said stored accrued performance parameters for storage in said associated IC card memory, such that said IC card contains said accrued performance parameters for transport to a remote location.

16. The system of claim 15 wherein said vehicle interface device comprises a connector disposed proximate to said fuel intake port for being interfaced with a mating socket upon fuel being introduced to said fuel intake port.

17. The system of claim 15 wherein said memory device is operable to initiate storing of and averaging of said performance parameters upon a predetermined event.

18. The system of claim 17 wherein said predetermined event comprises an access of said stored accrued performance parameters from said memory device through said vehicle interface device after introduction of fuel through said fuel intake port.

19. A vehicle emissions monitoring system comprising:
- a sensor for sensing emission parameters of the vehicle;
- a memory device for storing and averaging said emission parameters over a predetermined period of time as accrued emission parameters to provide a history of said sensed emission parameters over said predetermined period of time;
- a vehicle interface device for allowing said stored accrued emission parameters to be accessed; and
- a fuel intake port for allowing fuel to be input to a fuel tank;
- said vehicle interface device operating in response to the operation of fuel being input to said fuel intake port.

20. The system of claim 19 wherein said memory device is operable to initiate storing of and averaging of said performance parameters upon a predetermined event.

21. The system of claim 20 wherein said predetermined event comprises an access of said accrued performance parameters from said memory device through said vehicle interface device after introduction of fuel through said fuel intake port.

22. The system of claim 19 wherein said vehicle interface device comprises a connector disposed proximate to said fuel intake port for being interfaced with a mating socket upon fuel being introduced to said fuel intake port.

* * * * *

UNITED STATES PATENT AND TRADEMARK OFFICE
CERTIFICATE OF CORRECTION

PATENT NO. : 5,343,906　　　　　　　　　　　　Page 1 of 2
DATED : September 6, 1994
INVENTOR(S) : Harry F. Tibbals, III It is certified that error appears in the above-indentified patent and that said Letters Patent is hereby corrected as shown below:

In the Abstract:

Line 7, replace "dam" with --data--.

Line 10, replace "dam" with --data--.

Column 1. The Technical Field of the Invention is missing. Please insert the following before "BACKGROUND OF THE INVENTION."

--TECHNICAL FIELD OF THE INVENTION

The present invention pertains in general to emission data collecting systems and, more particularly, to a system for collecting emissions data from vehicles (gasoline, diesel, propane, liquid natural gas, or other combustion powered vehicles) as they are being refueled.--

Column 5, line 27, replace "dam" with --data--.

Column 5, line 63, replace "dam" with --data--.

Column 7, line 21, replace "dam" with --data--.

UNITED STATES PATENT AND TRADEMARK OFFICE
CERTIFICATE OF CORRECTION

PATENT NO. : 5,343,906

DATED : September 6, 1994

INVENTOR(S) : Harry F. Tibbals, III

It is certified that error appears in the above-indentified patent and that said Letters Patent is hereby corrected as shown below:

Column 7, line 38, replace "them" with --there--.

Column 7, line 46, replace "dam" with --data--.

In the Claims:

Column 9, Claim 1, line 14, insert --:-- following "having".

Signed and Sealed this

Twenty-fifth Day of April, 1995

Attest:

BRUCE LEHMAN

*Attesting Officer*     *Commissioner of Patents and Trademarks*